March 15, 1955 J. D. MADARAS 2,704,248
METHOD OF SEPARATING FERROUS METAL FROM ITS GANGUE
Filed Nov. 7, 1949 2 Sheets-Sheet 1
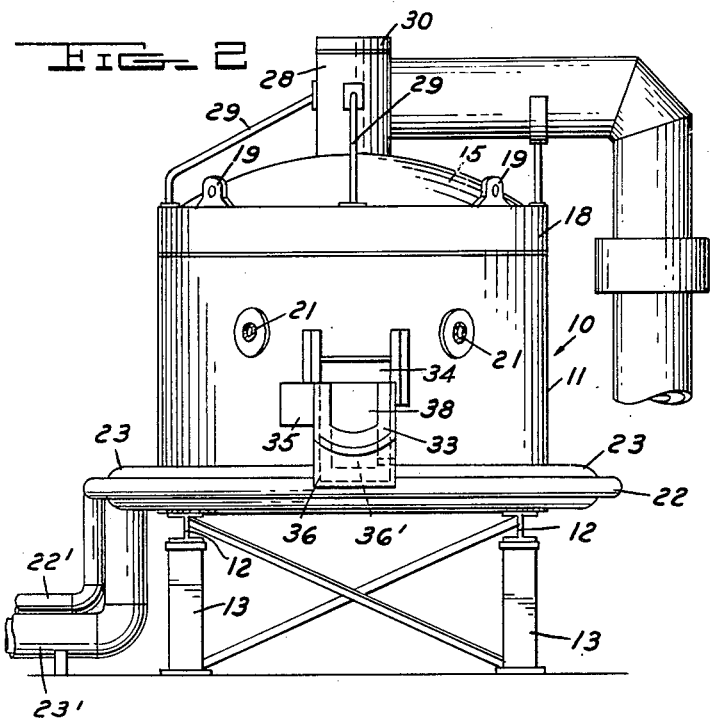
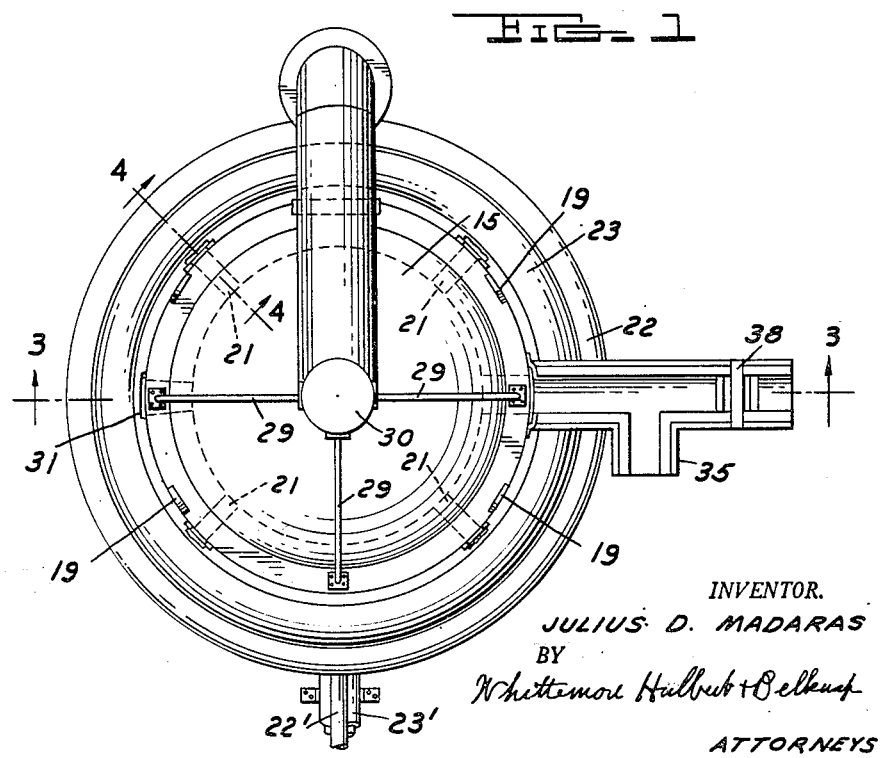
INVENTOR.
JULIUS D. MADARAS
BY
ATTORNEYS March 15, 1955   J. D. MADARAS   2,704,248
METHOD OF SEPARATING FERROUS METAL FROM ITS GANGUE
Filed Nov. 7, 1949   2 Sheets-Sheet 2
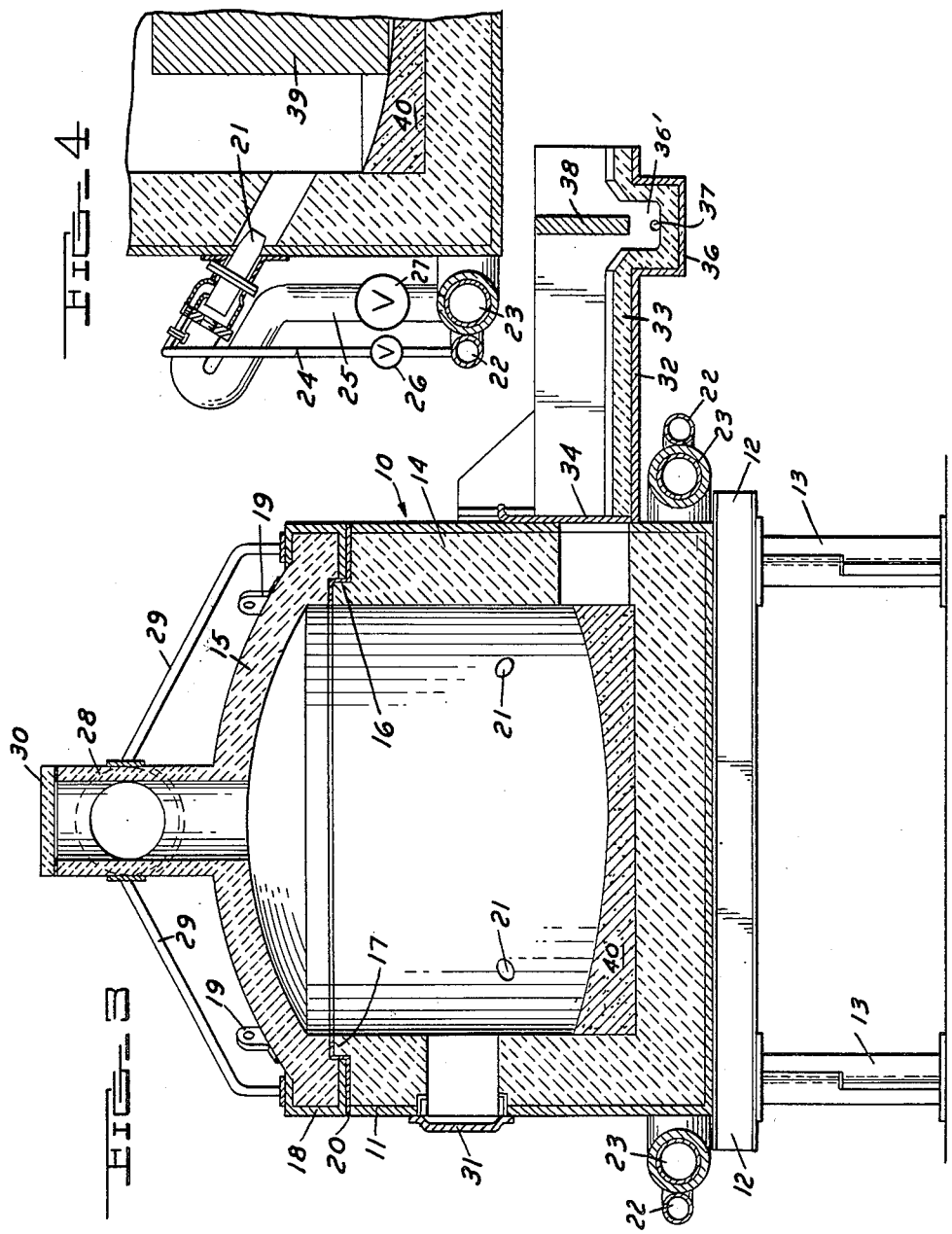
INVENTOR.
JULIUS D. MADARAS
BY
ATTORNEYS United States Patent Office 2,704,248
Patented Mar. 15, 1955

2,704,248

METHOD OF SEPARATING FERROUS METAL FROM ITS GANGUE

Julius D. Madaras, Detroit, Mich., assignor to Madaras Corporation, Wilmington, Del., a corporation of Delaware Application November 7, 1949, Serial No. 125,936

6 Claims. (Cl. 75—40)

The invention relates generally to the heating and melting of solid materials in a furnace, and more particularly to an improved method for carrying out the desired heating and melting, as well as other chemical treatment, of solid materials such as sponge iron, iron ore, manganese oxide and the like.

It is an object of the present invention to provide a method of heating and melting which permits accurate control of conditions such as the type of atmosphere and temperature within the furnace.

It is a further object to provide a method in which the fullest advantage is taken of the heat produced by the chemical reactions taking place during the process.

It is a still further object to provide a method whereby the refractory lining of the furnace is protected from the harmful effects normally caused by contact with deteriorating elements present in the slag.

These and other objects and advantages of the present invention will be apparent from the following description.

In the drawings:

Fig. 1 is a plan view of a furnace suitable for carrying out the teachings of my invention;

Fig. 2 is a front elevation thereof;

Fig. 3 is a vertical section taken on line 3—3 of Fig. 1; and

Fig. 4 is a section taken on line 4—4 of Fig. 1.

Referring now to the drawings, the numeral 10 designates a furnace construction which will serve to illustrate the operation of my improved process. The furnace 10 has a steel shell or casing 11 which rests upon steel I-beams 12 which are supported by means of suitable columns 13. The furnace is provided with a refractory lining 14 formed of any suitable material. A dome shaped refractory roof 15 has an annular groove 16 which engages a reduced annular portion 17 of the furnace lining 14. A channel shaped steel ring 18 surrounds the periphery of the refractory roof 15 and is provided with a suitable number of apertured brackets 19 by means of which the roof may be lifted from the furnace if desired. A suitable gasket 20 provides a tight seal between the furnace and the roof.

The furnace is heated by means of a plurality of injector type gas burners or tuyères 21 suitably located in the furnace. A pair of concentric bustle pipes 22 and 23 encircle the base of the furnace and are respectively connected by conduits 22' and 23' to a supply of gas and preheated air (not shown). Gas pipes 24 and insulated hot air pipes 25 are connected to the respective bustle pipes and supply the air and gas to the tuyères 21. Valves 26 and 27 are provided to control the flow of the gas and air to the tuyères.

A refractory lined stack 28 for removing the products of combustion is provided in the roof 15 and is braced by means of support rods 29. A hinged cover 30 on top of the stack may be opened if desired to permit charging the materials into the furnace. An inspection door 31 is hinged to the front of the furnace and provides an additional opening for charging the furnace.

A substantially U-shaped trough 32, lined with refractory material 33, extends out from one side of the furnace and communicates with the interior by means of a sliding door 34. A spout 35 projects laterally out from one side of the trough 32 for the purpose of removing the slag from the furnace. A channel shaped depression 36 extends transversely across the bottom of the trough 32 beyond the spout 35 forming a well or trap 36' for the molten iron or other metal, and is provided with a drain plug 37. A wall 38 extends transversely between the walls of the trough 32 and projects downwardly into the well 36' to prevent slag from entering the well along with the molten metal.

The charge 39, which may consist of a block of sponge iron or other material, is placed in the furnace and rests on a layer of refractory sand 40 on the bottom thereof.

After the furnace has been charged with the material to be treated, combustible gas and preheated air are admitted to the tuyères 21. If desired, oil may be used instead of gas, but whatever fuel is used, the ratio of air and fuel is normally adjusted so that the flame is either neutral or reducing. The exact nature of the flame may be varied according to the nature of the materials being heated. When melting sponge iron, for example, with natural gas as the fuel, 5.5 volumes of air to 1 volume of natural gas will give a suitable neutral or reducing flame. Other ratios such, for example, as 6.1 or 6.5:1 of air and gas, may also be suitable in many instances.

The gas mixture through the tuyères is directed so that combustion occurs at or near the line where the solid or plastic metal is in contact with the molten metal bath. The force of the jets may be so adjusted that the jets will be strong enough to burn holes into the solid charge, whereby the combustion occurs inside of the solid so that the flame envelops the entire solid or plastic mass to be melted. By thus following the principle of surface combustion, the intensity and reactivity of the nascent heat over the surface of the solid or plastic mass is made much greater than is the case when the combustion occurs at a distance from the materials to be melted.

The above described method of melting is particularly adapted for use with sponge iron in which a considerable amount of gangue consisting mostly of acidic compounds such as silica and alumina is present. These acidic compounds, being of refractory nature, melt at higher temperatures than does the iron, so that the iron is melted and drips down into the molten bath long before the gangue reaches the melting point. The refractory gangue provides a large surface and mass for heat absorption, and the molten iron bath may then be tapped leaving the unmolten gangue in the furnace. The unmolten gangue may then be removed from the top of the furnace or brought to the fluid stage and removed through the slagging spout.

The melting of the gangue may be accomplished by dropping hot lime or other hot fluxing materials into the gangue to react therewith. This reaction is strongly exothermic and generates a great deal of heat. The heat of slag formation thus generated completes the melting of the gangue to form fluid slag. Of course, if the gangue of the sponge iron happens to be basic, acidic slag forming fluxes will be added.

A further advantage of this type of melting will now be described. The refractory lining of a melting furnace is affected not only by the high temperature used, but even more seriously by the chemical action of the slag. This chemical action, as is well known to those familiar with the art, depends upon various factors such as the amount of contact between the slag and the lining, the composition and fluidity of the slag, and especially upon the nature of the fluxing elements in the slag such as lime, fluorspar and iron oxide. The unmolten slag is relatively harmless to the lining, and does not seriously affect the lining until the addition of hot fluxes causes the slag to melt.

In my method, I am able to control the contact of the molten slag with the furnace lining in such a way as to considerably reduce the harmful effects of the slag. Since metals such as iron, nickel and manganese melt at a lower temperature than the refractory slag, the molten metal bath in the center of the furnace will be covered and surrounded by the unmolten slag. Lime or fluorspar or both, preferably at a temperature of from 2000° to 3000° F. are dropped through the upper cover 30 near the center of the gangue surface and away from the furnace lining. The hot fluxes react exothermically with the gangue at the point of contact to form fluid slag. Theoretically, the heat evolved in forming a pound of $CaOSiO_2$ from the gangue is approximately 372 B. t. u., and for forming a pound of CaOAl₂O₃ the heat evolved is 1000 B. t. u., which amounts to 2840 B. t. u. per pound of lime used. If desired, additional hot lime may be added to form 2CaOAl₂O₃ thereby producing an additional 2800 B. t. u. per pound of lime added. Further addition of lime forms 3CaOAl₂O₃ producing an additional 2800 B. t. u. per pound of lime added.

The formation of a pound of 2CaOAl₂O₃ slag produces 1460 B. t. u., while the formation of a pound of 3CaOAl₂O₃ slag produces 1750 B. t. u. This heat is available not only for raising the temperature of the slag, but also for raising the temperature of the molten metal bath and supplying the needed heat for performing endothermic chemical reactions. The gangue around the furnace lining, however, will protect the lining as long as the reaction between the gangue and flux takes place at the center of the furnace and is prevented at the lining surface. The fluid slag may be tapped out with the molten metal while the plastic gangue around the refractory walls of the furnace may be left and not removed.

The process may now be repeated by placing a new charge of hot sponge iron into the furnace, or if desired, the materials to be melted may be periodically charged into the furnace in a continuous process.

In order to facilitate and speed up the reaction between the fluxing material and the gangue, a strong jet of flame from one of the tuyères may be directed at the point where the flux and gangue are reacting. This produces local heating and aids in stirring and mixing the molten slag. If desired, it is also possible to introduce powdered lime along with the gas stream rather than through the top of the furnace.

As stated, considerable heat is produced during the reaction of the flux with the hot gangue. For example, the heat produced in the formation of one pound of lime-silica slag will raise the temperature of the slag by about 1600° F., and the heat released by forming one pound of alumina slag will raise the temperature of the CaOAl₂O₃ slag by approximately 5000° F. The heat released by forming one pound of 2CaOAl₂O₃ slag will raise its temperature by about 6300° F., and in forming one pound of 3CaOAl₂O₃ the temperature is raised approximately 7600° F. A considerable amount of the heat thus produced is available for quickly raising the temperature of the molten iron, the specific heat of which is 0.15 B. t. u. per pound per degree F. as compared to a specific heat of 0.23 for the slag. This excess amount of heat may also be utilized in carburizing the iron bath, since increased temperature greatly increases the carbon absorbing power of iron or steel. Carbon, in the form of charcoal, coke or graphite may be added at the hottest spots in the molten iron and slag. The flame from the tuyère agitates the iron thereby aiding in the absorption of carbon.

A further advantage of carburizing the molten metal to a high degree while the slag formation is taking place is that the materials are exceedingly hot at this stage. This, together with the effect of the nascent reactions and nascent heat, aids greatly in increasing carbon absorption and in making the carbon structure unusually fine.

A stream of natural gas may also be blown into the agitated slag forming area, or liquid tar may be sprayed into it. The heat of the slag formation then acts to crack the hydrocarbon, so that the metal can absorb a considerable part of the carbon thus made available. The hydrogen liberated during cracking may also be used for reducing iron or for other purposes. Also, crushed or lumpy charcoal or powdered carbon may used for carburization.

The heat generated by the slag formation may also be used for reducing manganese oxide, silica or other metallic oxides to metallic manganese or silicon or other metals in the following manner. As explained above, the gangue of the sponge iron consists mostly of silica and alumina, with the hot plastic gangue floating on top of the hot fluid iron. Pouring white hot lime onto the center of the gangue results in the formation of fluid slag which is surrounded by hot plastic gangue. Natural gas, or hot partially cracked natural gas containing carbon, is now blown into the molten slag, and the nascent reducing gas thus produced reduces the manganese oxide and the silica to metallic manganese and silicon which alloy with the iron bath. Also, carbon may be added instead of reducing gas, and submerged into the hot slag to carry out the reduction of the manganese oxide, silica and other oxides.

As is well known, the thermochemical reducing reaction of silica and manganese oxide with carbon or reducing gas is very strongly endothermic. However, in my method as outlined above, the heat generated by the slag formation is utilized in supplying the additional heat required to reduce and precipitate out the manganese and silicon, thus overcoming the tendency of the slag to bind the manganese oxide and silica. By proper adjustment of the reducing flame in each instance, it is possible to reduce the oxides of whatever metals it is desired to reduce. Those oxides that can not be practically reduced by reducing gas may be reduced by the addition of carbon.

It will be understood that, by proper regulation of the valves controlling the proportions of air and gas admitted to the tuyères, the flame may be made either oxidizing or reducing in nature. This allows the melting and treating of various types of materials. For instance, the hot charge 39 in the furnace may be a preheated mass of iron ore, which may or may not have been partially reduced before charging into the furnace. By blowing in hot reducing gas as previously described, the iron ore contacted by the gas is reduced to iron, which will be at least partially melted in the process. The flame may now be made oxidizing by reducing or cutting off the flow of gas to the tuyères. The oxidizing flame reoxidizes a part of the already reduced ore thereby producing a comparatively large quantity of heat.

For illustration, if the iron ore and partially reduced iron and gangue are originally at 2300° F., the exothermic reaction of the reducing flame may raise the surface temperature of the mass to approximately 2400° F., or higher. If the flame is now made oxidizing, the reduced iron will be reoxidized thereby liberating additional heat. For example, reoxidizing one pound of iron liberates 2700 B. t. u. which serves to melt approximately 8 to 10 pounds of metallic iron with its usual amount of slag and to raise its temperature to about 2800° F. The amount of solid material that will be melted by the heat created by oxidizing one pound of iron may be calculated from the specific heats of iron and slag, which are 0.15 and 0.23 respectively. The iron thus melted sinks to the bottom while the iron oxide mixes with the molten slag. Now, by blowing a suitably strong jet of reducing gas into the slag, the iron oxide and possibly some other oxides present are reduced to metal which sinks into the molten bath. The reduction of the iron oxide in the slag is enhanced by the agitating action of the jet of reducing gas which makes the slag foamy thereby increasing the contact between the oxide and the reducing gas. The reaction between the reducing gas and the molten iron oxide is strongly exothermic, thereby producing heat which aids in increasing the temperature of the molten bath and of the entire charge. In some cases, if the excess heat is not used up for melting or for chemical reactions and the temperature becomes very high, it may be advisable to protect the refractory walls from slag reaction by placing hot silica or alumina sand around the edge of the slag bath.

Manganese oxide and silicon oxide may also be reduced by the following method. Briquettes formed of a mixture of carbon and silica or manganese oxide, or both, are prepared and preheated to a desired high temperature. Then, when the hot lime and alumina of the gangue react to form liquid slag and produce heat as described above, the briquettes are charged into the hot bath. The hot fluid slag surrounding the briquettes supplies the heat for the reducing reaction between the oxide and the carbon in the briquettes. By properly proportioning the carbon and silica in the briquettes the carbon will act to prevent the silica from reacting with the lime-alumina slag, and the reduced silicon will drip down into the molten metal bath while the residual carbon is absorbed by carburizing the bath.

In some instances it is practical and desirable to place a mass of charcoal or carbon in some other form on top of the slag and then push it down into the slag and the metal bath. As long as there is excess heat available to carry out the endothermic reaction, the carbon will reduce the silica or other oxides which are reducible at the particular temperature existing during the operation. By releasing the pressure on the carbon it will rise to the surface and may be pushed down again. Repeating this procedure several times greatly enhances the reduction of the oxides in the slag and the carburization of the molten metal.

It will be appreciated that the proper atmospheric control necessary during the above described operations may be accomplished by controlling the air and gas ratios admitted to the tuyères. If desired, the tuyères may be constructed so that the direction of the flame or gas jet can be controlled and directed to any spot within the furnace, and the temperature of the flame is easily controlled by regulating the temperature of the preheated air or gas.

What I claim as my invention is:

1. A method of separating ferrous metal from its associated gangue comprising charging the ferrous metal and gangue into a heating furnace, melting the metal while maintaining the gangue in an unmolten condition, melting the gangue in the center of the furnace while maintaining it in its unmolten condition at the sides of the furnace, and withdrawing the molten metal from the furnace.

2. A method of separating ferrous metal from its associated gangue comprising charging the ferrous metal and gangue into a heating furnace, melting the metal to form a molten metal bath while maintaining the gangue in an unmolten condition so that it floats on the metal bath, melting the gangue in the center of the furnace while maintaining it in its unmolten state around the sides of the furnace, and withdrawing the molten metal and gangue.

3. A method of separating ferrous metal from its associated gangue comprising charging the ferrous metal and gangue into a refractory lined furnace, melting the metal to form a molten metal bath while maintaining the gangue in an unmolten plastic condition so that it floats on the metal bath, adding hot flux to the central portion of the gangue to react therewith to form fluid slag, keeping the flux away from the outer edges of the gangue so that the gangue remains plastic at the outer edges where it contacts the refractory lining, and tapping the molten metal and slag from the furnace.

4. A method of separating ferrous metal from its associated gangue comprising charging the ferrous metal and gangue into a refractory lined gas furnace provided with heating tuyères, directing a reducing flame from said tuyères against the charge, controlling the intensity of said flame so that it melts the metal to form a molten metal bath while preventing the gangue from melting, reacting hot flux with the central portion of the gangue to produce fluid slag while preventing formation of slag at the edges of the gangue where it contacts the refractory lining, and tapping the molten metal and slag from the furnace.

5. A method of heating and melting sponge iron comprising charging the solid sponge iron into a refractory lined gas furnace provided with heating tuyères, directing a reducing flame from said tuyères against said sponge iron to melt the same while preventing the associated gangue from melting, adding hot flux to the central portion of the unmolten gangue to react therewith to produce fluid slag at the center of the furnace, directing a flame from said tuyères at the central portion of said gangue to which the flux has been added to produce additional heating at that point thereby aiding the slag forming reaction, and removing the molten iron and slag from the furnace.

6. A method of heating and melting iron ore comprising charging the solid iron ore into a refractory lined gas furnace provided with heating tuyères, directing a reducing flame from said tuyères against said iron ore to reduce and partially melt the same, causing the flame from said tuyères to become oxidizing thereby partially reoxidizing said iron and producing additional heat within the furnace to aid in completely melting the charge, and then making the flame from said tuyères reducing again so as to complete the reduction of the partially oxidized molten iron.

References Cited in the file of this patent

UNITED STATES PATENTS

| Number | Name | Date |
|---|---|---|
| 1,185,394 | Greene | May 30, 1916 |
| 1,283,515 | Hill | Nov. 5, 1918 |
| 1,615,009 | Frost | Jan. 18, 1927 |
| 1,717,160 | Kichline | June 11, 1929 |
| 1,897,881 | Basset | Feb. 14, 1933 |
| 2,026,683 | Johansen | Jan. 7, 1936 |
| 2,067,373 | Basset | Jan. 12, 1937 |
| 2,108,034 | Eppensteiner | Feb. 15, 1938 |
| 2,450,343 | Howard | Sept. 28, 1948 |
| 2,476,453 | Peirce | July 19, 1949 |